United States Patent
Orihara

(10) Patent No.: US 10,581,142 B2
(45) Date of Patent: Mar. 3, 2020

(54) ANTENNA DEVICE AND ELECTRONIC APPARATUS

(71) Applicant: DEXERIALS CORPORATION, Tokyo (JP)

(72) Inventor: Katsuhisa Orihara, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 16/302,056

(22) PCT Filed: May 22, 2017

(86) PCT No.: PCT/JP2017/018982
§ 371 (c)(1),
(2) Date: Nov. 15, 2018

(87) PCT Pub. No.: WO2017/208878
PCT Pub. Date: Dec. 7, 2017

(65) Prior Publication Data
US 2019/0190125 A1    Jun. 20, 2019

(30) Foreign Application Priority Data
May 30, 2016  (JP) ................. 2016-107528

(51) Int. Cl.
*H04B 5/00* (2006.01)
*H01Q 1/24* (2006.01)
(Continued)

(52) U.S. Cl.
CPC .......... *H01Q 1/243* (2013.01); *H01Q 1/2208* (2013.01); *H01Q 1/2266* (2013.01); *H01Q 1/24* (2013.01);
(Continued)

(58) Field of Classification Search
CPC .. H04B 1/3827; H04B 1/3833; H04B 5/0025; H04B 5/0062; H04B 5/0075;
(Continued)

(56) References Cited

U.S. PATENT DOCUMENTS

| | | | |
|---|---|---|---|
| 7,088,249 B2 * | 8/2006 | Senba ................ | G06K 7/10336 343/788 |
| 2014/0080411 A1 * | 3/2014 | Konanur .............. | H04B 5/0031 455/41.1 |

(Continued)

FOREIGN PATENT DOCUMENTS

| | | |
|---|---|---|
| CN | 104584323 A | 4/2015 |
| JP | 5673854 B2 | 2/2015 |

(Continued)

OTHER PUBLICATIONS

Aug. 8, 2017 Search Report issued in International Patent Application No. PCT/JP2017/018982.
(Continued)

*Primary Examiner* — Quochien B Vuong
(74) *Attorney, Agent, or Firm* — Oliff PLC

(57) ABSTRACT

An antenna device has: an antenna coil inductively coupled to the external device and provided by winding around a conducting wire such that wires opposing in width direction via an opening will be close to each other and divided such that one side part in which the wire is wound around in one direction and other side part in which the wire is wound around in other direction, via a center line longitudinally traversing the opening in a longitudinal direction; and an electronic apparatus cover having an opening, wherein the cover is having a magnetic shielding function, and the antenna coil is arranged in the opening provided at the cover such that the antenna coil is not overlapped with the cover, and also, an area of the cover opening at the other side part (Continued)

side is wider than an area of the cover opening at the one side part side.

6 Claims, 7 Drawing Sheets

(51) Int. Cl.
  *H01Q 7/06* (2006.01)
  *H01Q 1/22* (2006.01)
  *H01Q 1/52* (2006.01)
(52) U.S. Cl.
  CPC .............. *H01Q 1/526* (2013.01); *H01Q 7/06* (2013.01); *H04B 5/0062* (2013.01)
(58) Field of Classification Search
  CPC ... H04B 5/0081; H04B 5/02; H04M 2250/04; H04W 4/80; H02J 7/025; H02J 50/10; H01F 17/0033; H01F 17/04; H01F 27/28; H01F 27/2823; H01F 38/14; H01F 2003/106; H01Q 1/24; H01Q 1/243; H01Q 1/526; H01Q 1/2208; H01Q 1/2266; H01Q 7/06
  USPC ... 455/41.1, 41.2, 41.3, 552.1, 553.1, 556.1, 455/557; 343/702, 788, 867, 895
  See application file for complete search history.

(56) References Cited

U.S. PATENT DOCUMENTS

| | | | | |
|---|---|---|---|---|
| 2014/0176382 | A1* | 6/2014 | Nakano | H01Q 1/243 343/788 |
| 2016/0149305 | A1* | 5/2016 | Jeon | H01Q 7/06 343/788 |
| 2016/0268674 | A1* | 9/2016 | Orihara | H01Q 7/06 |

FOREIGN PATENT DOCUMENTS

| | | |
|---|---|---|
| JP | 2015-095707 A | 5/2015 |
| JP | 2016-058825 A | 4/2016 |

OTHER PUBLICATIONS

Nov. 12, 2019 Office Action issued in Chinese Patent Application No. 201780030201.8.

* cited by examiner

ANTENNA DEVICE AND ELECTRONIC APPARATUS

BACKGROUND OF THE INVENTION

Field of the Invention

The present invention relates to an antenna device mounted in an electronic apparatus such as a laptop computer and communicating with an external device such as a transmitter via an electromagnetic field signal, and an electronic apparatus in which this antenna device is incorporated. The present application claims priority based on Japanese Patent Application No. 2016-107528 filed in Japan on May 30, 2016, which is incorporated by reference herein.

Description of Related Art

Recently, a technology enabling communication between an electronic apparatus such as a laptop computer and an external device such as a smartphone by mounting an antenna function such as RFID (Radio Frequency Identification) on the electronic apparatus has been developed. However, in a laptop computer being downsized and getting thinner, housing is often made of metal, and it blocks radio wave, so it was difficult to secure communication performance of an antenna.

Here, an antenna device being capable of communication, by exposing at least a part of an antenna module at an opening of a metal plate, is proposed.

For example, in Patent Literature 1, an antenna device, wherein a metal member is arranged to cover a part of an antenna coil, and the metal member is having an opening not communicated to outer periphery, and by seeing in vertical direction with respect to the opening of the metal member, a first part of the antenna coil is not exposed from the opening of the metal member, and a second part of the antenna coil and at least a part of a coil opening are exposed from the opening of the metal member, is described.

In addition, in Patent Literature 2, an antenna device incorporated in an electronic apparatus and communicating with an external device via an electromagnetic field signal, comprising an antenna coil positioned at an end of an opening provided at a cover of the electronic apparatus, which is having a magnetic shielding function, to be disposed on an inner wall surface of the cover, is described.

Patent Literature 1: JP 5673854 B
Patent Literature 2: JP 2015-95707 A

SUMMARY OF THE INVENTION

Along with downsizing of an electronic apparatus such as a laptop computer and increase of number of components by high functionalization, in a housing of the electronic apparatus, a space allocated for mounting the above antenna device is getting smaller. Here, a demand for thinning the antenna device is getting stronger, for mounting the antenna device for RFID in narrow space in a condition that sufficient communication performance is secured.

In Patent Literatures 1 and 2, a part of the antenna coil is overlapped with a metal plate around an opening, so thickness is increased as they are overlapped. Therefore, it is not described about thinning of the antenna device regarding this point.

The present invention is proposed considering these circumstances, and the present invention provides new and improved antenna device and electronic apparatus capable of achieving thinning in a condition that sufficient communication performance is secured.

One embodiment of the present invention is an antenna device incorporated in an electronic apparatus and communicating with an external device via an electromagnetic field signal, comprising: an antenna coil inductively coupled to the external device and provided by winding around a conducting wire such that conducting wires opposing in width direction via an opening will be close to each other and divided into two parts, i.e. one side part in which the conducting wire is wound around in one direction and other side part in which the conducting wire is wound around in other direction, via a center line longitudinally traversing the opening in a longitudinal direction; and a cover of the electronic apparatus having an opening, wherein the cover is having a magnetic shielding function, and the antenna coil is arranged in the opening provided at the cover such that the antenna coil is not overlapped with the cover, and also, an area of the opening of the cover at the other side part side is wider than an area of the opening of the cover at the one side part side.

According to one embodiment of the present invention, it is possible to achieve thinning of the antenna device as the antenna coil and the cover are not overlapped, by arranging the antenna coil in the opening provided at the cover of the electronic apparatus, and it is possible to secure communication performance as magnetic field of the antenna device spreads sufficiently in a space, by providing wide opening at the other side part side of the antenna coil.

At this time, in one embodiment of the present invention, the antenna coil may be arranged such that the one side part is located adjacent to an end of the opening of the cover.

By arranging as the above, it is possible to make the opening of the cover at the other side part side to be widest, so it is possible to secure excellent communication performance.

In addition, in one embodiment of the present invention, a magnetic sheet is inserted in the opening of the antenna coil for pulling in magnetic field transmitted from the external device, and the antenna coil and the magnetic sheet may be overlapped with each other such that the magnetic sheet is arranged at the external device side with respect to the antenna coil in the one side part of the antenna coil and that the antenna coil is arranged at the external device side with respect to the magnetic sheet in the other side part of the antenna coil.

In this way, magnetic flux from the external device is collected and induced to a center of the antenna coil by the magnetic sheet, so it is possible to improve communication characteristics of the antenna device.

At this time, in one embodiment of the present invention, a magnetic sheet may be arranged also at the opening of the cover at the other side part side.

In this way, it is possible to collect magnetic flux even more, so communication characteristics of the antenna device is improved even more.

In addition, in one embodiment of the present invention, it may comprise a sheet-like conductor overlapped with or contacting the cover, and also, at least partially overlapped with a surface of the antenna coil opposite to a surface of the antenna coil opposing to the external device.

In this way, it is possible to improve communication characteristics of the antenna device by using shielding effect of magnetic field.

In addition, in other embodiment of the present invention, it is an electronic apparatus, in which the antenna device described in any of the above is incorporated, and capable of communicating with an external device via an electromagnetic field signal.

In other embodiment of the present invention, it is possible to configure the electronic apparatus capable of achieving thinning in a condition that sufficient communication performance is secured, by comprising the above antenna device.

As explained above, according to the present invention, it is possible to provide the antenna device and the electronic apparatus capable of achieving thinning in a condition that sufficient communication performance is secured by arranging the antenna coil in the opening provided at the cover of the electronic apparatus, and by having the opening with sufficient area at one side.

BRIEF DESCRIPTION OF THE DRAWINGS

FIG. 6A is a perspective view, and FIG. 6B is a plan view.

DETAILED DESCRIPTION OF THE INVENTION

Hereinafter, explaining in detail about preferred embodiments of the present invention. In addition, the embodiments explained in below will not unjustly limit the content of the present invention described in claims, and it is not limited that all the structures explained in the embodiments are necessary as means for solving the problem of the present invention.

Figure 1:
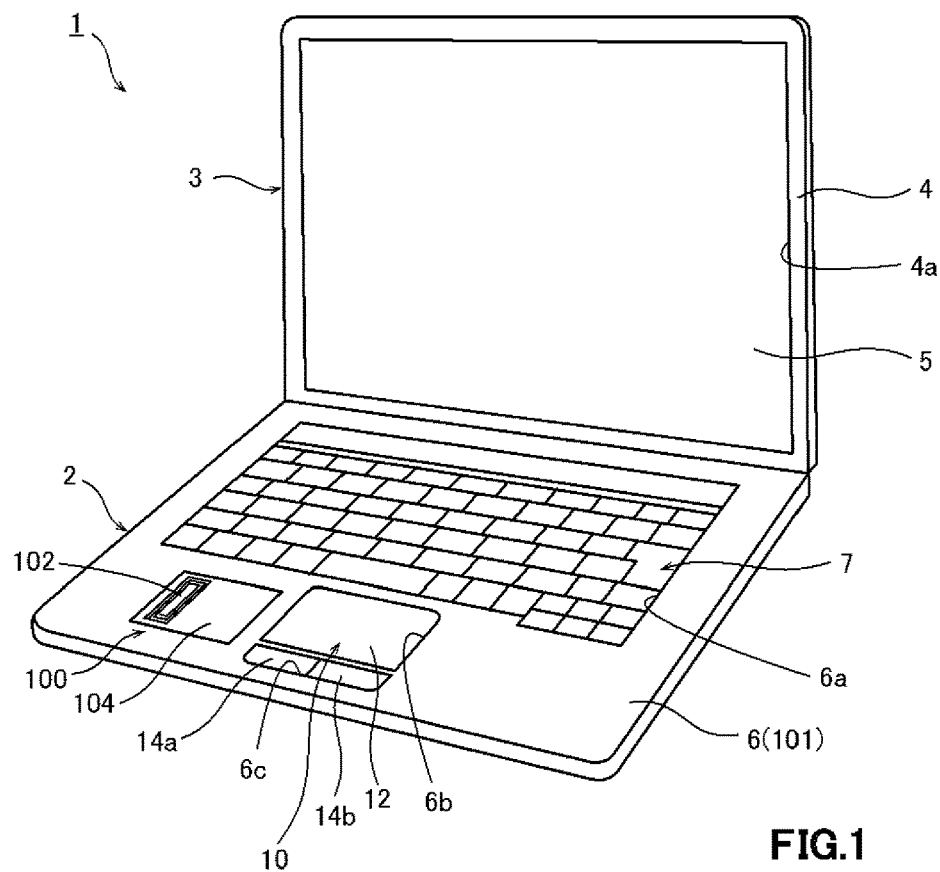
FIG. 1 is a perspective view illustrating an appearance of a personal computer mounting an antenna device relating to one embodiment of the present invention.

At first, it is explained about a configuration of a personal computer, which is an example of an electronic apparatus 1 applying an antenna device 100 relating to one embodiment of the present invention, using drawings. FIG. 1 is a perspective view illustrating an appearance of a personal computer mounting an antenna device 100 relating to one embodiment of the present invention.

The antenna device 100 relating to one embodiment of the present invention is applied mainly to a laptop type personal computer as the electronic apparatus 1. The electronic apparatus 1 (personal computer) comprises a main body 2 and a display 3, and the main body 2 and the display 3 are connected via a hinge or the like. The display 3 can be rotated with the hinge as a fulcrum from a state, in which the display 3 is overlapped to the main body 2 normally placed flat (closed state), to a state, in which the display 3 is standing with respect to the main body 2 reversibly (open state).

For example, the display 3 comprises a display housing 4 made of resin. The display housing 4 is in a flat box shape, and for example, it is having a size approximately equal to A4 paper. The display housing 4 is having a surface (inner surface) opposing to a main body 2 when the display 3 is in the closed state, and at inner surface of the display housing 4, an opening 4a is formed over approximately entire area. At the opening 4a of the display housing 4, for example a liquid crystal panel 5 is exposed.

The main body 2 comprises a main housing 6 in a flat box shape. At upper surface of the main housing 6 opposing to the display 3 when the display 3 is in the closed state, an opening 6a is arranged at far side when seeing toward the liquid crystal panel 5, i.e. at hinge side, and a keyboard 7 is arranged in this opening 6a. In addition, a size of the upper surface of the main housing 6 is approximately identical with a size of the inner surface of the display housing 4.

In addition, in the upper surface of the main housing 6, an opening 6b is formed at a center in front of the keyboard 7. At this opening 6b, a face sheet 12 of a touch pad 10 is exposed. Further, in the upper surface of the main housing 6, an opening 6c is formed in front of the opening 6b, and at this opening 6c, two operation buttons 14a and 14b are exposed aligning in a width direction of the main housing 6.

For example, in the above laptop type personal computer (electronic apparatus 1), the antenna device 100 relating to one embodiment of the present invention is provided with an opening 104 on the main housing 6 (a cover 101 having a magnetic shielding function), in addition to the opening 6a and the openings 6b and 6c in which the keyboard 7 and the touch pad 10 are arranged, and an antenna coil 102 is arranged in the opening 104. By arranging the antenna coil 102 in the opening 104 provided at the cover 101 of the electronic apparatus 1 such that the antenna coil 102 is not overlapped with the cover 101, it is possible to achieve thinning of the electronic apparatus. In addition, the cover 101 indicated here is, for example made of metal, and having a magnetic shielding function. In addition, in the electronic apparatus 1 in which the antenna device 100 is incorporated, it is preferable to configure that the antenna device 100 having the opening 104 is not exposed to outside, for example by covering the antenna device 100 with a member not having a magnetic shielding function.

In addition, the electronic apparatus 1, in which the antenna device 100 is incorporated, relating to one embodiment of the present invention is not limited to a laptop type personal computer, it can be applied to any electronic apparatus with a space for arranging the antenna device 100, and for example, it can be applied to other electronic apparatus such as television or refrigerator. In addition, the opening 104 for arranging the antenna device 100 relating to one embodiment of the present invention may be provided on the cover 101, but for example, an opening already opened according to a structure of the electronic apparatus 1 may be used.

Figure 2:
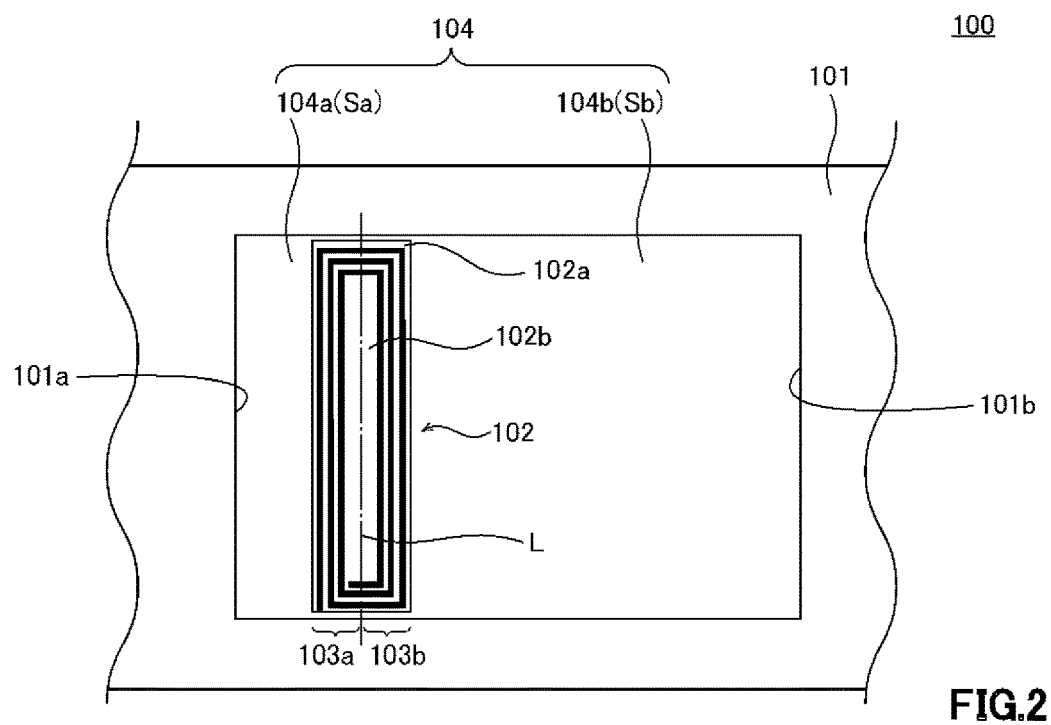
FIG. 2 is a plan view illustrating a schematic structure of the antenna device relating to one embodiment of the present invention.

Next, explaining about the antenna device 100 relating to one embodiment of the present invention in more detail, using the drawings. FIG. 2 is a plan view illustrating the antenna device 100 relating to one embodiment of the present invention.

An antenna device 100 relating to one embodiment of the present invention is an antenna device 100 incorporated in an electronic apparatus 1 and communicating with an external device via an electromagnetic field signal, comprising: an antenna coil 102 inductively coupled to the external device and provided by winding around a conducting wire 102a such that conducting wires 102a opposing in width direction via an opening 102b will be close to each other and divided into two parts, i.e. one side part 103a in which the conducting wire 102a is wound around in one direction and other side part 103b in which the conducting wire 102a is wound around in other direction, via a center line L longitudinally traversing the opening 102b in a longitudinal direction; and a cover 101 of the electronic apparatus 1 having an opening 104. The cover 101 is having a magnetic shielding function, and the antenna coil 102 is arranged in the opening 104 provided at the cover 101 such that the antenna coil 102 is not overlapped with the cover 101, and also, an area Sb of the opening 104b of the cover 101 at the other side part 103b side is wider than an area Sa of the opening 104a of the cover 101 at the one side part 103a side.

In this way, it is possible to achieve thinning of the antenna device 100, as the antenna coil 102 and the cover 101 is not overlapped, by arranging the antenna coil 102 in the opening 104 provided at the cover 101 of the electronic apparatus 1, and it is possible to secure excellent communication performance, as magnetic field of the antenna device 100 spreads sufficiently in a space, by providing the wide opening 104b at the other side part 103b side of the antenna coil 102.

As illustrated in FIG. 2, the antenna device 100 comprises the antenna coil 102 inductively coupled to the external device 119 (refer to FIG. 3B) and provided by winding around the conducting wire 102a such that the conducting wires 102a opposing in width direction via the opening 102b will be close to each other. The antenna coil 102 is formed by patterning processing the flexible conducting wire 102a, for example on a surface of an antenna substrate composed of an elastic flexible substrate or the like.

In the present embodiment, it is preferable that the antenna coil 102 is configured to be provided by winding around the conducting wire 102a in an elongated approximately rectangular shape in a longitudinal direction, for mounting the antenna coil 102 effectively in limited narrow space. In addition, the antenna coil 102 is arranged such that the area Sb of the opening 104b of the cover 101 at the other side part 103b side is wider than the area Sa of the opening 104a of the cover 101 at the one side part 103a side, in order to spread magnetic field of antenna in a space. Especially, it is preferable that the antenna coil 102 is arranged such that the one side part 103a is located adjacent to or contacting an end 101a of the opening 104 of the cover 101. By arranging as the above, it is possible to make the opening 104b of the cover 101 at the other side part 103b side to be widest, so it is possible to secure excellent communication performance. In addition, here, to locate adjacent to is to locate such that a distance from the end 101a of the opening 104 of the cover 101 to an outer edge of the one side part 103a of the antenna coil 102 will be equal to or less than one tenth of a length of short side of the antenna coil 102 (for example, when a contour of the coil was 50 mm*12.5 mm, it will be equal to or less than 1.25 mm).

In addition, here, the area Sa of the opening 104a of the cover 101 at the one side part 103a side is the area Sa of the opening 104a occupying from the end 101a of the opening 104 of the cover 101 to the outer edge of the one side part 103a of the antenna coil 102, and the area Sb of the opening 104b of the cover 101 at the other side part 103b side is the area Sb of the opening 104b occupying from other end 101b of the opening 104 of the cover 101 to an outer edge of the other side part 103b of the antenna coil 102. When the one side part 103a of the antenna coil 102 is contacting the end 101a of the opening 104 of the cover 101, the area Sa of the opening 104a of the cover 101 at the one side part 103a side is almost zero.

In addition, when the antenna coil 102 is located adjacent to the end 101a of the opening 104 of the cover 101, a position of the external device for communication will deviate to a side where the cover 101 exists from a position where the antenna coil 102 is arranged. (In other words, it deviates to the left cover 101 side from the antenna coil 102 in FIG. 2.) Therefore, when providing the opening 104 on the cover 101 of the electronic apparatus 1, it is desirable to provide the opening 104 such that there will be more area remained for an area of the cover 101 at a side where the antenna coil 102 is arranged.

An area of the opening 104 is not limited particularly, but the antenna coil 102 is arranged in the opening 104, so the opening 104 with an area at least larger than an area of the antenna coil 102 is necessary. It is better as the area of the opening 104 is larger, but it is decided in relation to a space of the cover 101 of the electronic apparatus 1 at which the opening 104 can be provided. As an example, one side of the opening 104 may be in a size approximately equal to or more than a long side of the antenna coil 102.

Figure 3A:
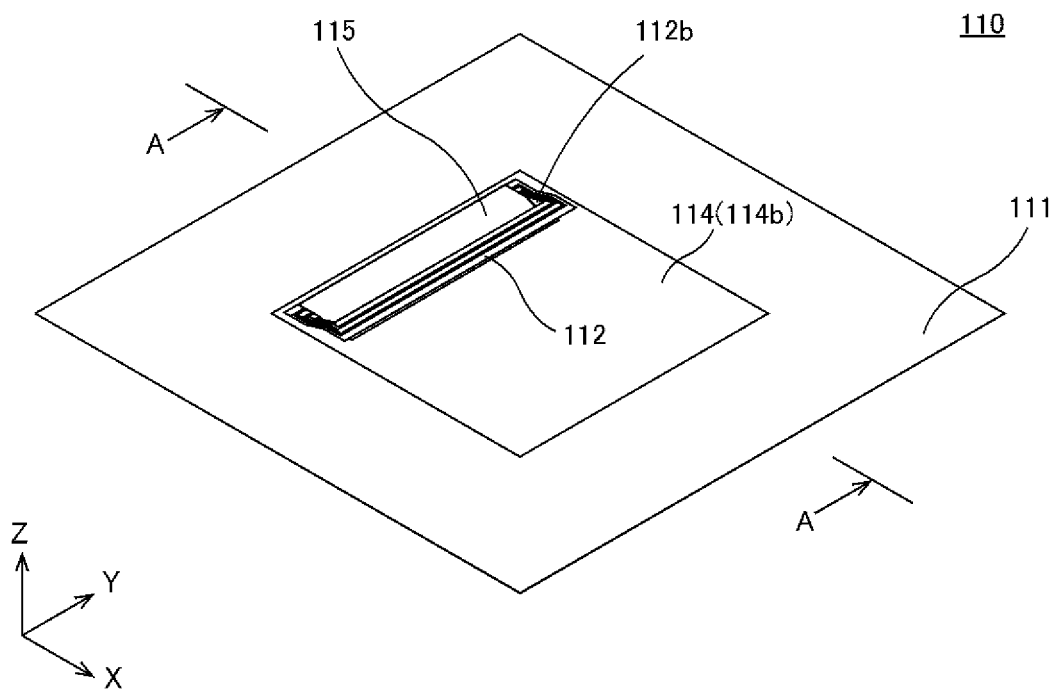
FIG. 3A is a perspective view of an antenna device relating to one embodiment of the present invention.

An antenna device 110 relating to one embodiment of the present invention may be configured to insert a magnetic sheet 115 in an opening 112b of an antenna coil 112 for pulling in magnetic field transmitted from an external device 119. FIG. 3A is a perspective view of an antenna device relating to one embodiment of the present invention, and FIG. 3B is a sectional view along line A-A of FIG. 3A.

Figure 3B:
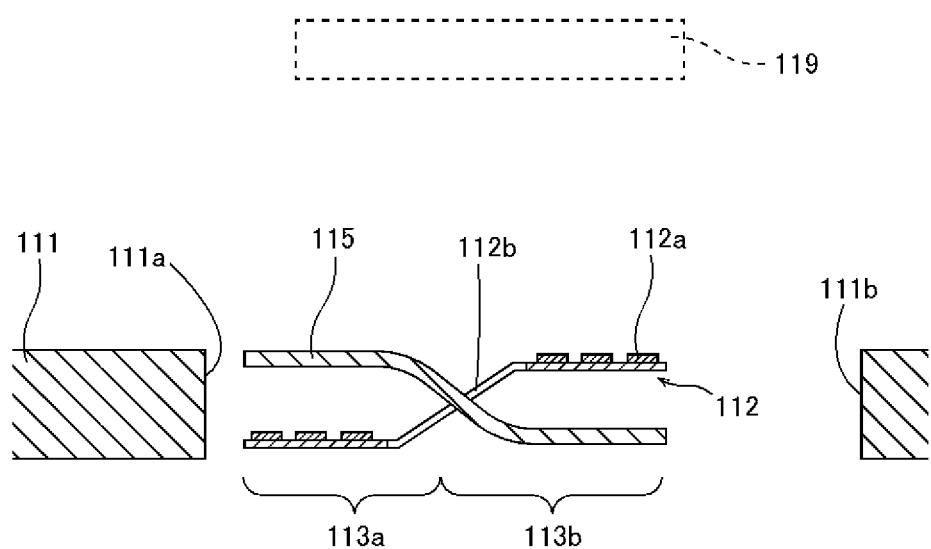
FIG. 3B is a sectional view along line A-A of FIG. 3A.

As illustrated in FIGS. 3A and 3B, in the antenna device 110, the magnetic sheet 115 is inserted in the opening 112b of the antenna coil 112, and the antenna coil 112 and the magnetic sheet 115 are overlapped with each other such that the magnetic sheet 115 is arranged at the external device 119 side with respect to the antenna coil 112 in one side part 113a of the antenna coil 112 and that the antenna coil 112 is arranged at the external device 119 side with respect to the magnetic sheet 115 in other side part 113b of the antenna coil 112.

The magnetic sheet 115 is formed from a magnetic substance such as iron oxide, chromium oxide, cobalt or ferrite, and it is having a function to induce magnetic flux transmitted from the external device 119 at the time of communication of the antenna device 110 to a center of the antenna coil 112, in order to improve communication characteristics of the antenna device 110.

In this way, in the antenna device 110 relating to one embodiment of the present invention, it is possible to improve communication characteristics of the antenna device 110 by collecting magnetic flux from the external device 119 and inducing magnetic flux to a center of the antenna coil 112, by arranging the magnetic sheet 115 to be located at the external device 119 side with respect to the antenna coil 112 in the one side part 113a side, and by arranging the antenna coil 112 to be located at the external device 119 side with respect to the magnetic sheet 115 in the other side part 113*b* side. In other words, magnetic flux from the external device 119 passes through the opening 112*b* of the antenna coil 112 along the magnetic sheet 115 and goes through to the external device 119 from an opening 114*b* of a cover 111 at the other side part 113*b* side of the antenna coil 112, so it will be possible to communicate as it is possible to form a loop. Further, in one embodiment of the present invention, as illustrated in FIG. 3B, the antenna coil 112 and the magnetic sheet 115 are not overlapped with the cover 111, so it is possible to achieve thinning of the antenna device 110.

Figure 4A:
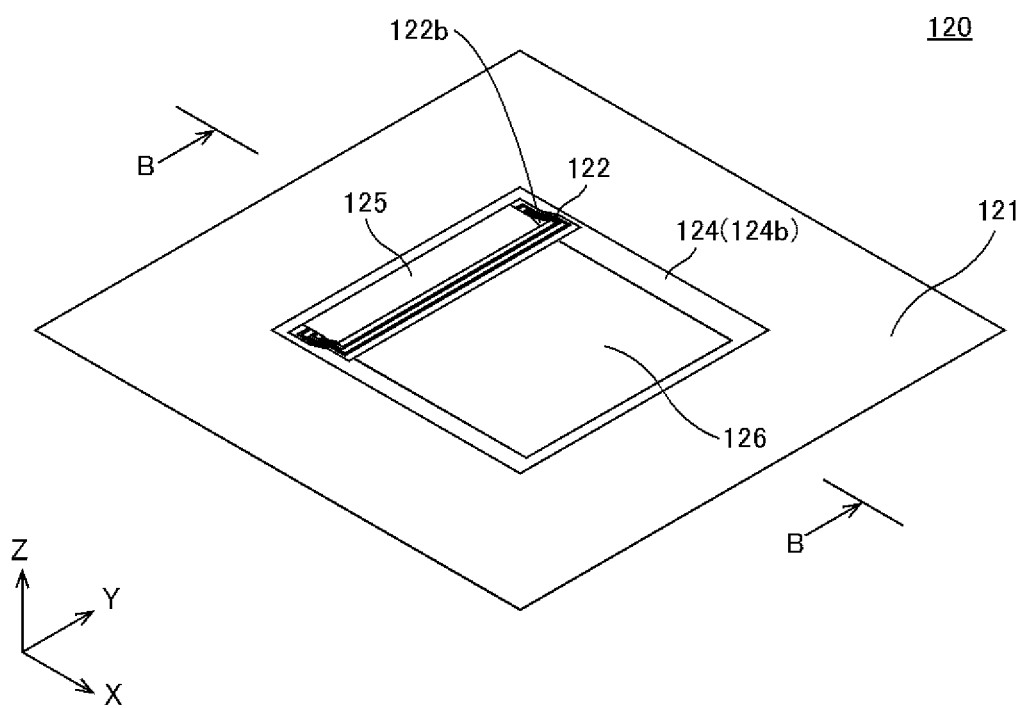
FIG. 4A is a perspective view of an antenna device relating to one embodiment of the present invention.
Figure 4B:
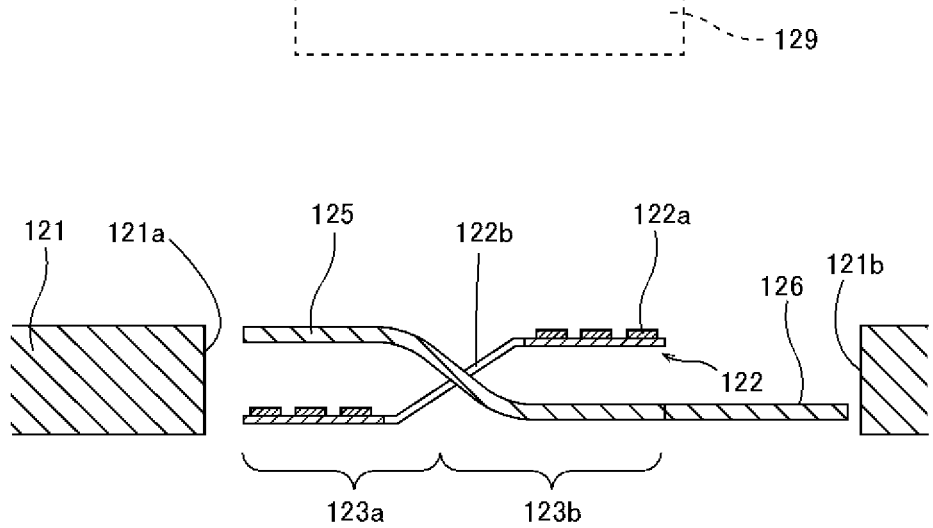
FIG. 4B is a sectional view along line B-B of FIG. 4A.

Regarding other embodiment of an antenna device 120 relating to the present invention, FIG. 4A is a perspective view of an antenna device 120 relating to one embodiment of the present invention, and FIG. 4B is a sectional view along line B-B of FIG. 4A. In one embodiment of the present invention, as illustrated in FIGS. 4A and 4B, a magnetic sheet 126 may be arranged at an opening 124*b* of a cover 121 at other side part 123*b* side. In this way, it is possible to collect magnetic flux even more, so communication characteristics of the antenna device 120 will be improved even more.

In addition, in FIG. 4B, a magnetic sheet 125 inserted in an antenna coil 122 and the magnetic sheet 126 arranged at the opening 124*b* of the cover 121 at the other side part 123*b* side are respectively separate members, but for example, one long magnetic sheet combining two magnetic sheets may be arranged and inserted in an opening 122*b* of the antenna coil 122.

Figure 5A:
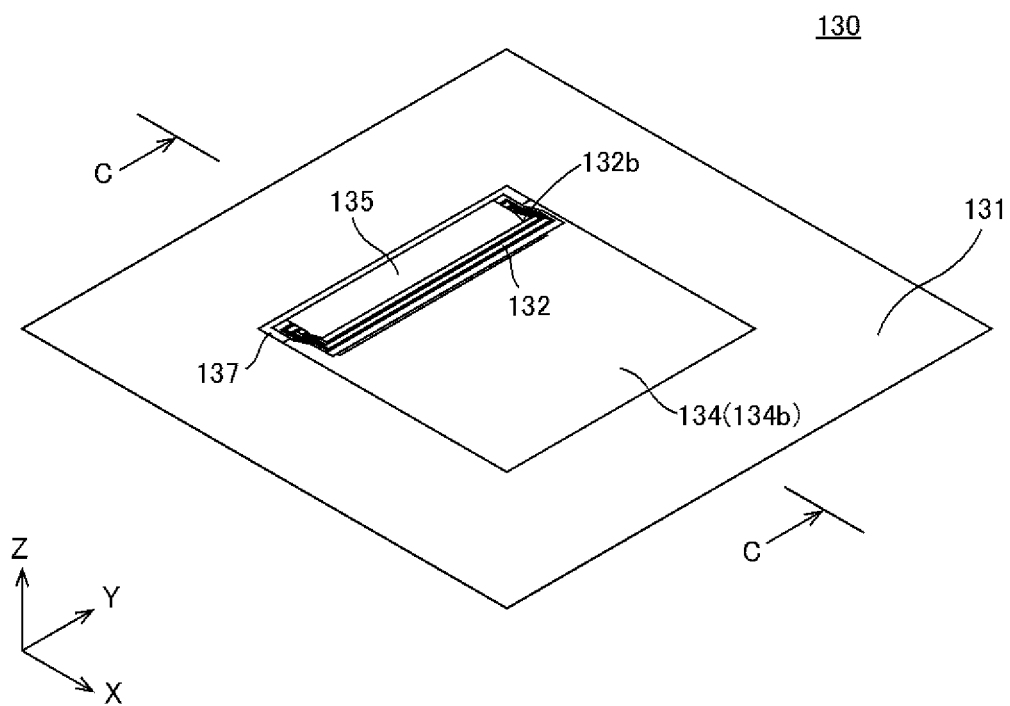
FIG. 5A is a perspective view of an antenna device relating to one embodiment of the present invention.
Figure 5B:
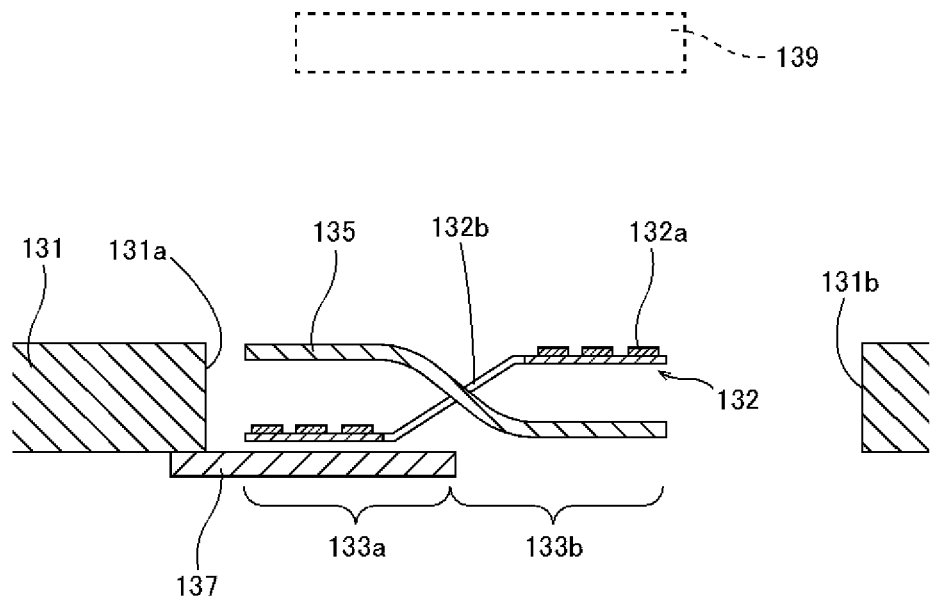
FIG. 5B is a sectional view along line C-C of FIG. 5A.

Regarding other embodiment of an antenna device 130 relating to the present invention, FIG. 5A is a perspective view of an antenna device 130 relating to one embodiment of the present invention, and FIG. 5B is a sectional view along line C-C of FIG. 5A. In one embodiment of the present invention, as illustrated in FIGS. 5A and 5B, it may comprise a sheet-like conductor (conductive sheet) 137 overlapped with or contacting a cover 131, and also, at least partially overlapped with a surface of an antenna coil 132 opposite to a surface of the antenna coil 132 opposing to an external device 139. As the conductive sheet 137, copper, aluminum foil or the like can be cited. By arranging the conductive sheet 137 as the above, it is possible to improve communication characteristics of the antenna device 130, by using shielding effect of magnetic field by the conductive sheet 137.

In addition, when it comprises the sheet-like conductor 137 as the antenna device 130 relating to the present invention, an opening 134 of the cover 131 should not be rectangular shape. For example, even when the opening of the cover is in circular shape or polygonal shape, it is possible to make an end of the opening 134 to be linear shape, by arranging the (rectangular) conductive sheet 137 at the end of the opening 134.

As explained in the above, in the antenna device applying the present invention and in the electronic apparatus in which the antenna device is incorporated, it is possible to achieve thinning of the housing of the electronic apparatus while maintaining excellent communication characteristics, by arranging the antenna coil in the opening provided at the cover of the electronic apparatus, and by providing wide opening at the other side part side of the antenna coil.

EXAMPLES

Next, explaining about examples of verification and evaluation of an antenna device relating to one embodiment of the present invention, using drawings. In addition, the present invention should not be limited by the examples.

Figure 6A:
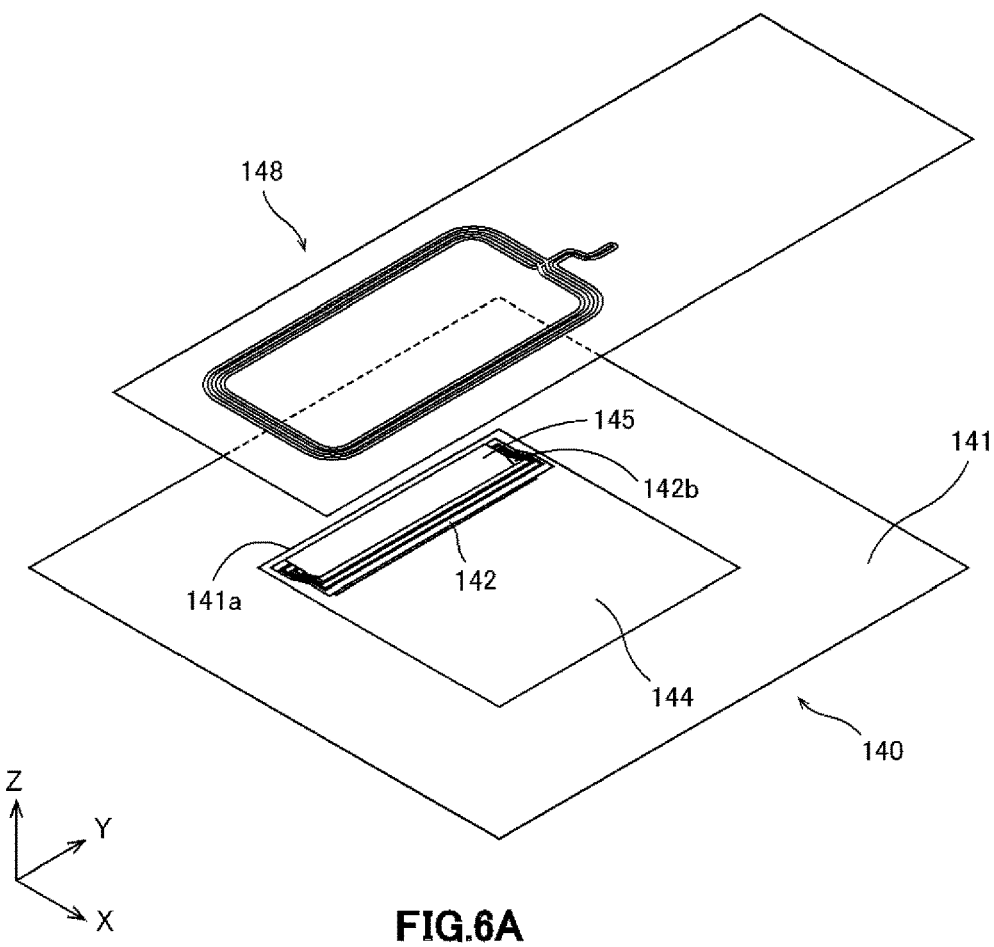
FIGS. 6A and 6B are explanatory views of a verification and evaluation method for confirming action and effect of the antenna device relating to one embodiment of the present invention.
Figure 6B:
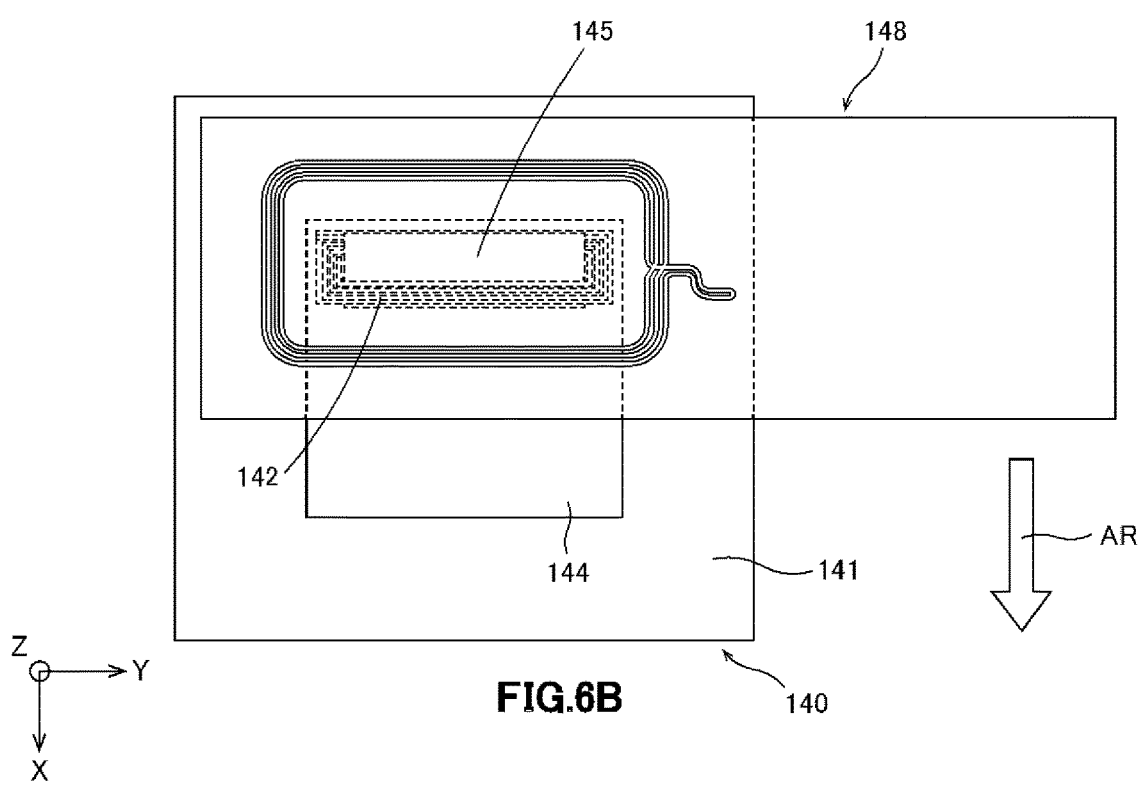

About antenna devices relating to examples 1 to 3, comparative example and reference example explained in below, evaluation of communication characteristics was performed. FIGS. 6A and 6B are explanatory views of an evaluation method for confirming action and effect of an antenna device 140 relating to one embodiment of the present invention, and FIG. 6A is a perspective view, and FIG. 6B is a plan view. Coupling coefficient between the antenna device 140 and a communicator 148 (Listener-1 defined by NFC Forum) was evaluated at a distance of 40 mm as communication characteristics, and a distribution of communication characteristics was evaluated by moving the communicator (Listener-1) in X axis direction.

Example 1

In example 1, an antenna coil 142 with a contour of 50 mm*12.5 mm formed by four turns of a conducting wire was used, and ferrite (magnetic sheet 145) with thickness of 0.2 mm was inserted into an opening 142*b* of the antenna coil 142. The antenna coil inserted with the magnetic sheet 145 was arranged at a SUS plate 141 with a contour of 100 mm*100 mm and having an opening 144 of 50 mm*50 mm at a center, such that a long side of the antenna coil 142 was arranged along a side 141*a* of the opening 144 provided at the SUS plate 141, and the antenna device 140 was formed. As illustrated in FIG. 6A, the antenna device 140 relating to the example 1 and the communicator 148 were arranged at a distance of 40 mm, and communication characteristics (coupling coefficient k) when relative position relation was changed by moving the communicator 148 in X axis direction (i.e. arrow AR direction of FIG. 6B) was evaluated.

Example 2

In example 2, similarly, communication characteristics (coupling coefficient k) when relative position relation was changed by moving the communicator in X axis direction was evaluated about an antenna device similar as the example 1 except that aluminum foil of 50 mm*10 mm was arranged at a surface of the antenna coil opposite to a surface of the antenna coil opposing to the communicator such that aluminum foil contacts the antenna coil and the SUS plate, in the antenna device relating to the example 1.

Example 3

In example 3, similarly, communication characteristics (coupling coefficient k) when relative position relation was changed by moving the communicator in X axis direction was evaluated about an antenna device similar as the example 2 except that ferrite (magnetic sheet) was arranged at the opening of the SUS plate other than the antenna coil, in the antenna device relating to the example 2.

Comparative Example

Figure 7:
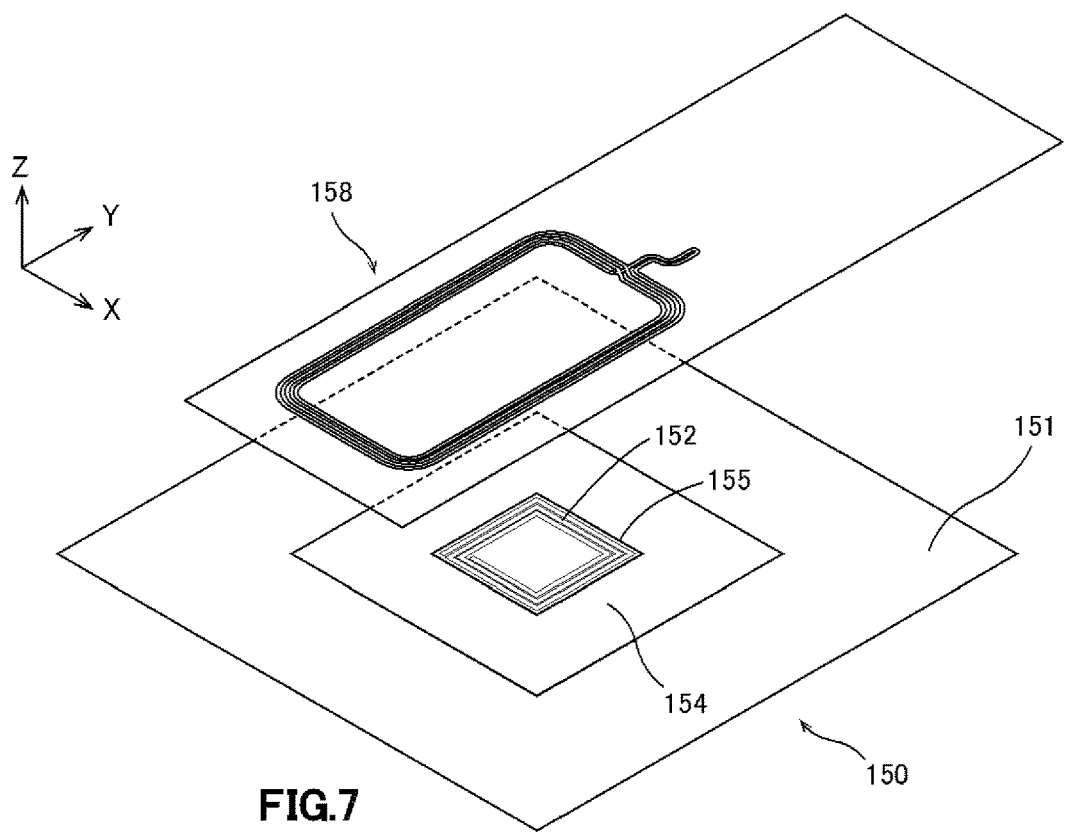
FIG. 7 is a perspective view for explaining a verification and evaluation method for confirming action and effect of an antenna device relating to comparative example.

FIG. 7 is a perspective view for explaining a verification and evaluation method for confirming action and effect of an antenna device relating to comparative example. In the comparative example, an antenna coil 152 in square shape with a contour of 25 mm*25 mm formed by four turns of a conducting wire was used, and ferrite (magnetic sheet 155) with thickness of 0.2 mm was applied at back surface of the antenna coil 152. The antenna coil 152, to which the magnetic sheet 155 was applied at back surface thereof, was arranged at SUS plate 151 with a contour of 100 mm*100 mm and having an opening 154 of 50 mm*50 mm at a center such that a center of the antenna coil 152 and a center of the opening 154 of the SUS plate 151 were coincided, and an antenna device 150 was formed. As illustrated in FIG. 7, the antenna device 150 relating to the comparative example and a communicator 158 were arranged at a distance of 40 mm, and communication characteristics (coupling coefficient k) when relative position relation was changed by moving the communicator 158 in X axis direction was evaluated.

Reference Example

Figure 8:
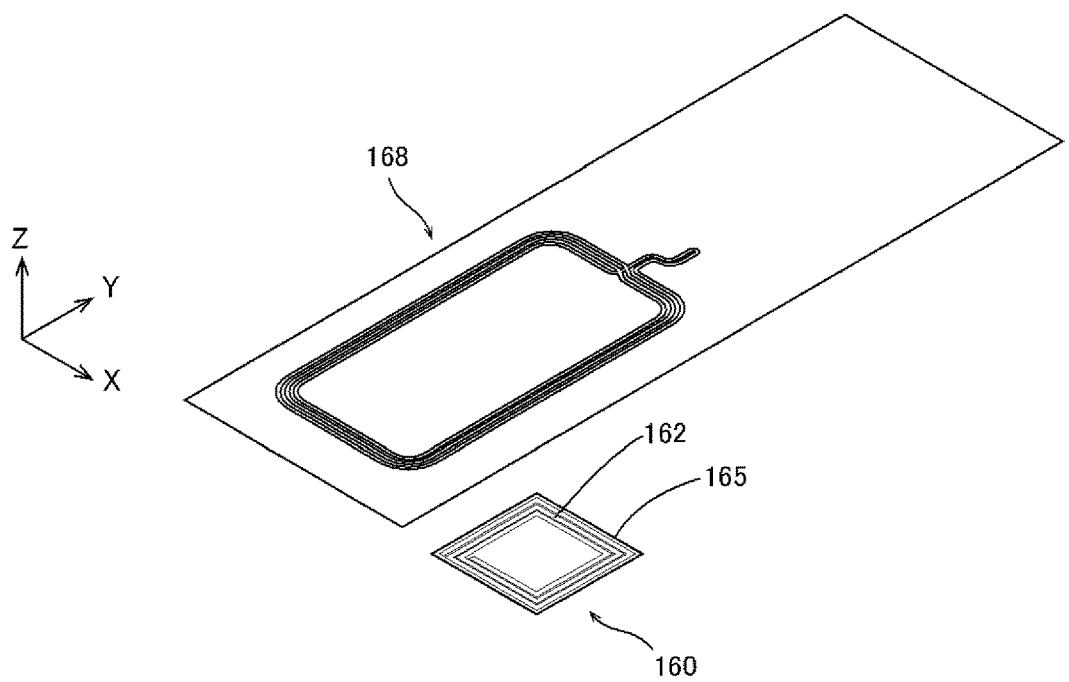
FIG. 8 is a perspective view for explaining a verification and evaluation method for confirming action and effect of an antenna device relating to reference example.

FIG. 8 is a perspective view for explaining a verification and evaluation method for confirming action and effect of an antenna device 160 relating to reference example. In the reference example (Benchmark), an antenna coil 162 in square shape with a contour of 25 mm*25 mm formed by four turns of a conducting wire was used, and ferrite (magnetic sheet 165) with thickness of 0.2 mm was applied at back surface of the antenna coil 162, and an antenna device 160 was formed without arranging a SUS plate around the antenna coil 162. As illustrated in FIG. 8, the antenna device 160 relating to the reference example and a communicator 168 were arranged at a distance of 40 mm, and communication characteristics (coupling coefficient k) when relative position relation was changed by moving the communicator 168 in X axis direction was evaluated.

Figure 9:
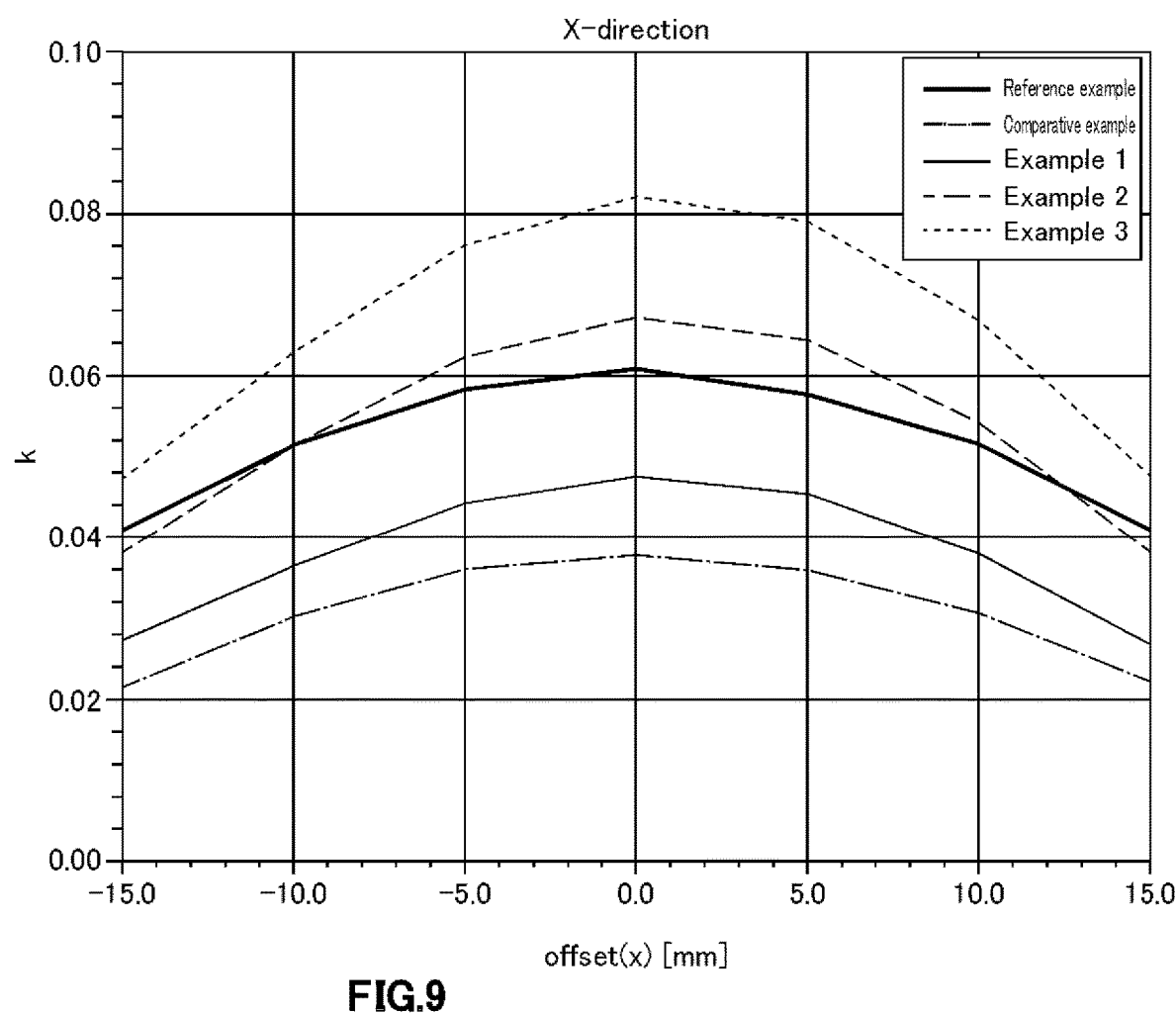
FIG. 9 is a graph illustrating evaluation result of communication performance for confirming action and effect of the antenna devices relating to examples 1 to 3, comparative example and reference example.

FIG. 9 is a graph illustrating evaluation result of communication performance for confirming action and effect of the antenna devices relating to examples 1 to 3, comparative example and reference example. With respect to the reference example as benchmark, when a square-shaped NFC antenna is mounted in a square-shaped opening of a metal plate as the comparative example, even by configuring a size of the opening to be an area four times a size of the antenna, a recovery of performance was only expected to the extent of about 60% of the reference example (benchmark).

On the other hand, in the example 1 in which a long antenna coil was arranged at an end of an opening of a metal plate, communication characteristics was improved more than the comparative example. Further, in the example 2 in which aluminum foil was arranged at the antenna coil, it showed communication characteristics better than the reference example (benchmark). In addition, the example 3, in which aluminum foil was added and a magnetic sheet was also arranged at the opening of the SUS plate, showed best communication characteristics.

As mentioned above, in the antenna device relating to one embodiment of the present invention, it is possible to secure excellent communication performance as magnetic field of the antenna device spreads sufficiently in a space by providing wide opening at other side part side of the antenna coil.

In addition, we have explained in detail about one embodiment and each example of the present invention as above, but it would be easy for those who skilled in the art to understand that various modifications are possible without substantively departing from new matters and effect of the present invention. Therefore, all of these modifications should be included in a scope of the present invention.

For example, terms described with different terms having broader or equivalent meaning at least once in description and drawings can be replaced with these different terms in any part of description and drawings. In addition, configuration and operation of the antenna device and the electronic apparatus are also not limited to those explained in one embodiment and each example of the present invention and it can be performed with various modifications.

GLOSSARY OF DRAWING REFERENCES

1 Electronic apparatus
2 Main body
3 Display
4 Display housing
4a Opening
5 Liquid crystal panel
6 Main housing
6a Opening
6b, 6c Opening
7 Keyboard
10 Touch pad
12 Face sheet
14a, 14b Operation button
100, 110, 120, 130, 140, 150, 160 Antenna device
101, 111, 121, 131, 141, 151 Cover
101a, 111a, 121a, 131a, 141a End of opening
101b, 111b, 121b, 131b Other end of opening
102, 112, 122, 132, 142, 152, 162 Antenna coil
102a, 112a, 122a, 132a, Conducting wire
102b, 112b, 122b, 132b, 142b Opening (of antenna coil)
103a, 113a, 123a, 133a One side part
103b, 113b, 123b, 133b Other side part
104, 114, 124, 134, 144, 154 Opening (of cover)
104a Opening (of cover at one side part side)
104b, 114b, 124b, 134b Opening (of cover at other side part side)
115, 125, 126, 135, 145, 155, 165 Magnetic sheet
137 Conductor (conductive sheet)
148, 158, 168 Communicator
119, 129, 139 External device
L Center line
AR Arrow
Sa Area of opening of cover at one side part side
Sb Area of opening of cover at other side part side

The invention claimed is:

1. An antenna device incorporated in an electronic apparatus and communicating with an external device via an electromagnetic field signal, comprising:
an antenna coil inductively coupled to the external device and provided by winding around a conducting wire such that conducting wires opposing in width direction via an opening will be close to each other and divided into two parts, i.e. one side part in which the conducting wire is wound around in one direction and other side part in which the conducting wire is wound around in other direction, via a center line longitudinally traversing the opening in a longitudinal direction; and
a cover of the electronic apparatus having an opening, wherein:
the cover is having a magnetic shielding function, and the antenna coil is arranged in the opening provided at the cover such that the antenna coil is not overlapped with the cover, and also, an area of the opening of the cover at the other side part side is wider than an area of the opening of the cover at the one side part side,
a magnetic sheet is inserted in the opening of the antenna coil for pulling in magnetic field transmitted from the external device,
the antenna coil and the magnetic sheet are overlapped with each other such that the magnetic sheet is arranged at the external device side with respect to the antenna coil in the one side part of the antenna coil and that the antenna coil is arranged at the external device side with respect to the magnetic sheet in the other side part of the antenna coil, and a magnetic sheet is arranged also at the opening of the cover at the other side part side.

2. The antenna device according to claim 1, comprising:

a sheet-like conductor overlapped with or contacting the cover, and also, at least partially overlapped with a surface of the antenna coil opposite to a surface of the antenna coil opposing to the external device.

3. The electronic apparatus, in which the antenna device according to claim 1 is incorporated, and capable of communicating with an external device via an electromagnetic field signal.

4. An antenna device incorporated in an electronic apparatus and communicating with an external device via an electromagnetic field signal, comprising:

an antenna coil inductively coupled to the external device and provided by winding around a conducting wire such that conducting wires opposing in width direction via an opening will be close to each other and divided into two parts, i.e. one side part in which the conducting wire is wound around in one direction and other side part in which the conducting wire is wound around in other direction, via a center line longitudinally traversing the opening in a longitudinal direction; and a cover of the electronic apparatus having an opening, wherein:

the cover is having a magnetic shielding function, and the antenna coil is arranged in the opening provided at the cover such that the antenna coil is not overlapped with the cover, and also, an area of the opening of the cover at the other side part side is wider than an area of the opening of the cover at the one side part side, the antenna coil is arranged such that the one side part is located adjacent to an end of the opening of the cover, a magnetic sheet is inserted in the opening of the antenna coil for pulling in magnetic field transmitted from the external device, the antenna coil and the magnetic sheet are overlapped with each other such that the magnetic sheet is arranged at the external device side with respect to the antenna coil in the one side part of the antenna coil and that the antenna coil is arranged at the external device side with respect to the magnetic sheet in the other side part of the antenna coil, and a magnetic sheet is arranged also at the opening of the cover at the other side part side.

5. The antenna device according to claim 4, comprising:

a sheet-like conductor overlapped with or contacting the cover, and also, at least partially overlapped with a surface of the antenna coil opposite to a surface of the antenna coil opposing to the external device.

6. The electronic apparatus, in which the antenna device according to claim 4 is incorporated, and capable of communicating with an external device via an electromagnetic field signal.

* * * * *